United States Patent [19]

Nagai et al.

[11] 4,230,758

[45] Oct. 28, 1980

[54] FLUORINE RESIN COATED STRUCTURE OF ALUMINUM OR ALUMINUM ALLOY

[75] Inventors: Shuzo Nagai; Seiji Watabe; Takao Ogino; Koichi Okita, all of Osaka, Japan

[73] Assignee: Sumitomo Electric Industries, Ltd., Osaka, Japan

[21] Appl. No.: 64,277

[22] Filed: Aug. 6, 1979

Related U.S. Application Data

[63] Continuation of Ser. No. 847,466, Oct. 31, 1977, abandoned, which is a continuation of Ser. No. 658,940, Feb. 17, 1976, abandoned.

[30] Foreign Application Priority Data

Feb. 14, 1975 [JP] Japan .................................. 50/19340

[51] Int. Cl.[2] ........................ A47J 36/02; B32B 3/00; B32B 15/08; B32B 15/20

[52] U.S. Cl. .................................... 428/141; 156/665; 220/456; 220/458; 428/161; 428/164; 428/334; 428/335; 428/336; 428/421; 428/422; 428/469

[58] Field of Search .......................... 75/138; 156/665; 220/456–458; 428/14, 156, 161, 164, 206, 209, 332, 334–336, 421, 422, 469, 472, 517, 519, 521, 539

[56] References Cited

U.S. PATENT DOCUMENTS

| | | | |
|---|---|---|---|
| 3,393,086 | 7/1968 | Keating | 428/422 |
| 3,419,414 | 12/1968 | Marks | 428/141 |
| 3,788,513 | 1/1974 | Racz | 428/156 |
| 3,983,275 | 9/1976 | Winter et al. | 428/35 |

*Primary Examiner*—Bruce H. Hess

*Attorney, Agent, or Firm*—Sughrue, Rothwell, Mion, Zinn and Macpeak

[57] ABSTRACT

A fluorine resin coated aluminum structure comprising:

(a) an aluminum substrate with a roughened surface;

(b) a coating of aluminum oxide formed on the surface of the aluminum substrate; and (c) a baked coating of a fluorine resin firmly bonded to the aluminum oxide coating, the fluorine resin coating having a thickness of about 5 to about 100 microns and a surface roughness represented by an $R_{max}$ value of about 5 to about 60 ($\mu$) and an $R_z$ value of about 4 to about 50 ($\mu$). This aluminum structure is especially useful as a material for cookware because of its superior anti-stick and low friction characteristics and the good adhesion of the resin coating to the substrate.

3 Claims, No Drawings

FLUORINE RESIN COATED STRUCTURE OF ALUMINUM OR ALUMINUM ALLOY

This is a continuation of application Ser. No. 847,466, filed Oct. 31, 1977 now abandoned, in turn a continuation of Ser. No. 658,940, filed Feb. 17, 1976 now abandoned.

BACKGROUND OF THE INVENTION

1. Field of the Invention

This invention relates to a fluorine resin coated structure of aluminum or an aluminum alloy.

2. Description of the Prior Art

As is well known, fluorine resins have the best thermal resistance, chemical resistance and electrical insulating properties among plastics, and, interestingly, possess "anti-stick" and low friction characteristics.

Fluorine resin coated structures of aluminum or an aluminum alloy (hereafter often merely "aluminum" for purposes of brevity), to which the present invention pertains, have rapidly gained acceptance in recent years as materials for cookware due to the useful anti-stick properties of fluorine resins. Fluorine resins, however, are difficult to bond, as will be appreciated from the fact that they have superior antistick properties. Various methods have been suggested to date for bonding fluorine resins, and the following four methods are now mainly in commercial use.

1. A "primer method" which comprises coating an aluminum substrate with a "primer" consisting of a dispersion or suspension of a fluorine resin having phosphoric acid or chromic acid added thereto to render a metal surface adhesive, drying and baking the coating to further render the metal surface adhesive, and then further coating a dispersion or suspension of a fluorine resin as a finishing layer, followed by drying and baking.

2. A "hard coat" method which comprises (1) forming a hard undercoat on the surface of an aluminum or an aluminum alloy substrate by (a) a flame spraying method involving spraying a hard metal or oxide powder such as alumina, nickel or chromium onto the surface after roughening the surface by, for example, sand blasting, or (b) a frit method involving coating a suspension containing a hard substance such as water glass or a ceramic or the aluminum substrate and baking it at high temperatures to adhere it to the aluminum substrate and therefore to provide raised and depressed portions on the surface, and then (2) performing the same primer method as in 1 above.

3. An etching method which comprises providing numerous fine raised and depressed portions by chemical etching which involves treating the surface of an aluminum or aluminum alloy substrate with, for example, a hydrochloric acid solution or by electrolytic etching which involves anodically treating the surface in a solution containing an electrolyte of a chloride using a direct current source, and then coating a dispersion or suspension of a fluorine resin on the etched surface, followed by baking.

4. A method which comprises forming an etched surface on the surface of aluminum or an aluminum alloy substrate by the same method as in 3 above, anodically oxidizing the aluminum surface with an aqueous solution containing at least one oxidized film-forming compound, such as an aqueous solution of sulfuric acid, to provide an oxidized aluminum coating on the etched surface, and then coating a dispersion of a fluorine resin on the oxide coating, followed by baking.

The fluorine resin coated structure obtained by the primer method suffers from a considerable deterioration in adhesive strength when exposed to hot water or hot oil. This defect poses a problem in using the structure in cookware. Since the primer contains chromic acid, the primer layer is colored dark. Thus, when only a fluorine resin is used in the finish layer, the dark color of the primer layer appears through the transparent fluorine resin layer, which makes the appearance of the cookware unpleasant. In order to avoid this, it is the general practice to cover the color of the undercoat by adding a pigment filler to the top coat. However, probably because the top coat contains substances other than the fluorine resin, the anti-stick property of the top coat tends to be reduced with use. Furthermore, the use of chromic acid is undesirable from the viewpoint of food sanitation when this structure is used in cookware.

The abrasion resistance of the coated structure obtained by method 1 in cookware is also a problem. Method 2 intends to increase the abrasion resistance of the fluorine resin by melt adhering a solid fine powder of a material such as metal or a ceramic to the aluminum surface.

Method 3 affords fine raised and depressed portions by etching the aluminum metal surface instead of forming a primer layer thereon, and thereby improves the adhesion of the fluorine resin to the metal surface. Probably because it utilizes mechanical adhesion, deterioration in adhesive strength hardly occurs upon exposure to hot water or hot oil, as compared with the primer method. Since no primer is required, no problems arise with regard to the color of the product or food sanitation. Furthermore, a filler such as a pigment is not used, and the fluorine resin alone can be coated. Accordingly, the anti-stick effect of the fluorine resin in cookware is hardly reduced, and this method is superior to the primer method. However, this method still does not enable one to solve the problem of adhesion between the fluorine resin and aluminum.

Method 4 is an improvement over method 3, and further improves the adhesion of the fluorine resin to aluminum, providing the best fluorine resin coated structure for cookware among these conventional methods.

However, the fluorine resin coated structure obtained by the last method, like that obtained by method 1, still has a problem with abrasion resistance. Although the fluorine resin has high mechanical strength, the fluorine resin coated surface of cookware undergoes heavy wear. This problem could be solved by melt adhering hard metal or ceramic as an undercoat layer. However, such a method has the defect of complicated production steps and high production cost, and adhesion of the fluorine resin to aluminum is not as satisfactory as in the case of method 1.

SUMMARY OF THE INVENTION

Based on extensive research, we noted that an oxide coating formed on the uneven surface of an aluminum substrate in order to increase the adhesion of the aluminum to a fluorine resin is hard, and thought that the formation of an oxide coating by metal spraying would serve to increase abrasion resistance. Further research finally led to the discovery that the abrasion resistance can be greatly improved by controlling the etching conditions, the anodic oxidation conditions and the thickness of the fluorine resin coating, and the same or a higher abrasion resistance than that obtained by metal flame spraying can be obtained.

We have specifically found that a fluorine resin coated structure of aluminum or an aluminum alloy (any aluminum or aluminum alloy can be used) has superior abrasion resistance when the fluorine resin coating has a thickness of about 5 to about 100 microns, and the surface roughness of the structure is represented by an $R_{max}$ of about 5 to about 60 ($\mu$) and an $R_z$ of about 4 to about 50 ($\mu$) as determined in accordance with JIS B0651.

DETAILED DESCRIPTION OF PREFERRED EMBODIMENTS

According to this invention, there is provided a fluorine resin coated structure comprising:

(a) an aluminum or aluminum alloy substrate having fine raised and depressed portions on its surface;

(b) a coating of aluminum oxide formed on the surface; and (c) a baked coating of a fluorine resin firmly bonded to the aluminum oxide coating, the fluorine resin coating having a thickness of about 5 to about 100 microns and a surface roughness represented by an $R_{max}$ value of about 5 to about 60 ($\mu$) and an $R_z$ value of about 4 to about 50 ($\mu$).

The production of fluorine resin coated structures of superior abrasion resistance depends upon a combination of the roughness and depth of the etched surface of the aluminum or aluminum alloy substrate, the thickness of the aluminum oxide coating formed thereon by anodic oxidation, and the thickness of the fluorine resin coating formed on top of the aluminum oxide coating. The preferred range of this combination is expressed in the present application by "surface roughness" which is measured by the method described below.

The fluorine resin coated structure of this invention can be produced in the following manner.

First, the aluminum or aluminum alloy substrate is etched to provide fine raised and depressed portions on its surface. The etching may be performed by chemical etching, electro-chemical etching and mechanical etching, with electro-chemical etching being preferred. For example, chemical etching comprises treating the surface with, for example, an aqueous solution of hydrochloric acid. Preferably, the etching is performed by electrochemically or anodically treating the surface using a direct current source with an aqueous solution containing at least one electrolyte consisting of an acid or salt containing chlorine such as hydrochloric acid, ammonium chloride, sodium chloride, potassium chloride, calcium chloride, zinc chloride, aluminum chloride and sodium hypochlorite, an acid or salt containing bromine such as ammonium bromide or hydrobromic acid, or an acid or salt containing iodide such as sodium iodide or hydroiodic acid, with hydrochloric acid, ammonium chloride and sodium chloride being economically preferred.

The extent of anodic etching is determined by the type and amount of the electrolyte used, and especially by the amount of electricity from the direct current source and the time of the anodic treatment. In particular, the amount of electricity is preferably at least about 20 coulomb/$cm^2$, especially preferably 30 to 100 coulomb/$cm^2$.

The voltage of the direct current used is from several to several ten, preferably from about 5 to about 20 V, and most preferably about 10 V. The temperature of the anodic treatment is not overly limited and is merely set so that the solution employed does not freeze or boil, and is preferably from room temperature to about 60° C., most preferably about 40° C. The time of the anodic treatment varies according to the dimensions of the material to be etched, and is usually from several seconds to several ten minutes. The operable range of the concentration of the aqueous solution is above about 1% by weight but an economically preferred range thereof is from about 1 to about 5% by weight, most preferably from about 2 to about 3% by weight, of the aqueous solution.

The etched surface of the substrate is then anodically oxidized in an aqueous solution of a compound capable of forming an aluminum oxide coating, e.g., an inorganic acid such as sulfuric acid or chromic acid, or an organic acid such as oxalic acid, sulfosalicylic acid, sulfophthalic acid, phenolsulfonic acid, or sulfamic acid (with sulfuric acid and oxalic acid being preferred) using an alternating current, a direct current or both.

This anodic oxidation is conducted using a current density of from about 0.001 A/$cm^2$ to about 0.1 A/$cm^2$, preferably from about 0.01 to about 0.05 A/$cm^2$, and most preferably about 0.02 A/$cm^2$ at a voltage of from several to several ten V at a temperature of from about 0° to 50° C., preferably from about 10° to about 30° C., most preferably 20° C. for several to several ten minutes, preferably from about 5 to about 20 minutes, at a solution concentration of from several to several ten%, preferably from about 5 to about 30% by weight, most preferably about 20% by weight, of the aqueous solution.

Then, a dispersion or suspension of a fluorine resin (any commercially available fluorine resin can be used), such as a tetrafluoroethylene resin or a tetrafluoroethylene hexafluoropropylene copolymer resin, is coated on top of the aluminum oxide coating, dried at a temperature of from about 80° to about 100° C. for several to several ten minutes, preferably from about 5 to about 10 minutes, followed by baking at a temperature above the sintering point of the fluorine resin, preferably from about 350° to about 450° C. for from about 5 to about 30 minutes. The coating of the resin dispersion can be performed by various methods such as spraying, roll coating, dip coating, flow coating or brush coating. The thickness of the coating should at least be such that the raised portions on the surface of the substrate are not exposed, while if the thickness is too large, the effect of improving abrasion resistance is reduced, and the quality of the product is unsatisfactory. For this reason, the thickness of the fluorine resin coating should be about 5 to about 100 microns.

The following Examples and Comparative Examples illustrate the present invention in greater detail. In the Examples and Comparative Examples both baking and drying were in the air, all percents are by weight and all processings were at atmospheric pressure, unless otherwise indicated.

The surface roughness, abrasion resistance and the adhesion between the substrate and the fluorine resin layer were determined by the following methods.

MEASUREMENT OF SURFACE ROUGHNESS

The surface roughness was measured by means of a tracer type surface roughness tester in accordance with JIS B0651. The tracer was a diamond needle with an angle of 90° whose standard value of the radius of the curvature at the tip was 2 microns.

The measured values were recorded on a 500-fold scale in the longitudinal direction, and on a 10-fold scale in the transverse direction (i.e., the tractor feeding direction).

The measured values were expressed by the maximum height $R_{max}$ ($\mu$) and the ten-point average roughness $R_z$ ($\mu$) in accordance with "surface roughness" set forth in JIS B0601.

Abrasion Resistance Test

A stainless steel brush (Model 20, a product of Shinko Kosen Kabushiki Kaisha) mounted on a jig at the end of a motor rotating at a speed of 450 rpm was urged against the coated surface of a test sample. The motor was rotated in water while exerting a load of 2 kg on the surface of the sample in contact with the brush, and the friction of the sample surface was evaluated.

After rotating the motor 30,000 times, the worn condition of the coated surface was visually evaluated on the following scale.

Very poor: the coating at the friction applied part was completely removed, and the aluminum surface was exposed Poor: the coating at the friction applied part was considerably removed, and the aluminum surface was exposed Good: at a portion of the friction applied part, the aluminum surface was exposed in a fine striped pattern Excellent: the friction applied part was scarcely changed

Test of Adhesion of Coating

A load was exerted on a jig whose tip was a spherical member having a diameter of 0.7 mm, the tip being made of a smooth-finished superhard alloy. While being maintained perpendicular, the jig was caused to scratch the surface of the coating to be tested, i.e., as a result of the load on the 0.7 mm diameter spherical member, it bit into the coating and the aluminum base thereunder. The distance over which the coating was scratched was set to 25 mm, and the condition of the coating after scratching visually observed. The load which caused a breakage of the coating and an exposure of the aluminum surface was measured. The adhesion was evaluated on the following scale by the rate of the decrease in the scratching load after immersing the sample for 50 hours in salad oil heated to 200° C.

Very poor: the scratching load was extremely reduced (more than 80%)

Poor: the reduction of the scratching load was great, and it becomes about 50% of the initial load Good: the reduction of the scratching load was small, up to 20%

Excellent: scarcely any reduction in the scratching load was observed

EXAMPLE 1

A 99% aluminum plate (JIS 1100) was immersed in a 3% aqueous solution of potassium chloride at a solution temperature of about 40° C. for 10 minutes and anodically etched using a direct current source to form fine raised and depressed portions on the surface of the aluminum metal. The amount of electricity used for the anodic etching was as shown in Table 1. The surface of the aluminum plate so treated was anodically oxidized by immersion in a 15% aqueous solution of sulfuric acid at 20° C. using a direct current source at 15 V for 10 minutes at current density of 0.02 A/cm². A 60 wt% aqueous dispersion of a tetrafluoroethylene resin having an average particle size of from about 0.2 to about 0.4$\mu$ and a molecular weight of from about $1\times10^6$ to about $10^7$* was coated by spray coating on the oxidized surface so that the thickness of the resulting coating was about 20 to 30 microns, and then dried at 100° C. for 10 minutes followed by baking at 380° C. for 30 minutes. The surface roughness, adhesion and abrasion resistance of the resulting coated plate were determined, and the results are shown in Table 1.

* The same resin was used in Examples 2, 4 and 5.

TABLE 1

| | Amount of Electricity Used for the Anodic Treatment (coulumb/cm²) | Surface Roughness of the Coated Plate $R_{max}$ ($\mu$) | Surface Roughness of the Coated Plate $R_z$ ($\mu$) | Quality of the Coated Plate: Abrasion Resistance | Quality of the Coated Plate: Adhesion of the Coating |
|---|---|---|---|---|---|
| Run No. | | | | | |
| 1-1 | 100 | 37 | 25 | Excellent | Excellent |
| 1-2 | 80 | 30 | 21 | Excellent | Excellent |
| 1-3 | 30 | 15 | 10 | Excellent | Excellent |
| Comparison Runs | | | | | |
| 1-1 | 10 | 4 | 3 | Poor | Poor |
| 1-2 | 0 | less than 2 | less than 2 | Very poor | Very poor |

EXAMPLE 2

A 99% aluminum plate (JIS 1100) was etched at its surface with a 15% aqueous solution of hydrochloric acid at a solution temperature of 40° C. for the periods of time indicated in Table 2, and the etched surface anodically oxidized under the same conditions as in Example 1. The aluminum plate so treated was then coated with tetrafluoroethylene resin in the same manner as in Example 1, and the coated plate tested for various properties. The results are shown in Table 2.

TABLE 2

| | Period of Treatment with HCl (minutes) | Surface Roughness of the Coated Plate $R_{max}$ ($\mu$) | Surface Roughness of the Coated Plate $R_z$ ($\mu$) | Quality of the Coated Plate: Abrasion Resistance | Quality of the Coated Plate: Adhesion of the Coating |
|---|---|---|---|---|---|
| Run No. | | | | | |
| 2-1 | 20 | 20 | 14 | Excellent | Excellent |
| 2-2 | 10 | 15 | 10 | Excellent | Excellent |
| Comparison Run | | | | | |
| 2-1 | 3 | 4 | 3 | Poor | Very poor |

EXAMPLE 3

An aluminum alloy plate (JIS A 5052) was immersed in a 3% aqueous solution of hydrochloric acid and anodically etched at a solution temperature of 40° C. for about 10 minutes by applying electricity of 50 coulomb/cm² using a direct current electric source. The treated aluminum alloy surface was then anodically oxidized in a 15% aqueous solution of sulfuric acid at 20° C. using a direct current source at a current density of 0.02 A/cm$^2$ for the periods of time indicated in Table 3. An aqueous dispersion of a tetrafluoroethylene/hexafluoropropylene copolymer of a particle size of from about 0.1 to about 0.2μ was coated on the oxidized surface as in Example 1 so that the thickness of the coating became about 25 microns, and then dried at 100° C. for 10 minutes followed by baking at 350° C. for 45 minutes. The coated plate was tested for various properties, and the results are shown in Table 3.

TABLE 3

| | Period of the Anodic Oxidation (minutes) | Surface Roughness of the Coated Plate $R_{max}$ (μ) | $R_z$ (μ) | Quality of the Coated Plate: Abrasion Resistance | Adhesion of the Coating |
|---|---|---|---|---|---|
| Run No. | | | | | |
| 3-1 | 30 | 13 | 7 | Excellent | Good |
| 3-2 | 15 | 15 | 8 | Excellent | Excellent |
| 3-3 | 5 | 16 | 8 | Good | Excellent |
| Comparison Run | | | | | |
| 3-1 | Not performed | 17 | 9 | Very poor | Good |

EXAMPLE 4

An aluminum alloy plate (JIS A 3003) was anodically etched by immersion in a 5% aqueous solution of sodium chloride at a temperature of 40° C. for 15 minutes by applying electricity in an amount of 80 coulomb/cm$^2$ to the aluminum surface using a direct current source. The treated surface was anodically oxidized at a current density of 0.02 A/cm$^2$ for 40 minutes in an aqueous solution of sulfuric acid in varying concentrations as shown in Table 4 at 25° C. and at 20 V using a direct current source. A tetrafluoroethylene resin was coated on the oxidized surface in the same manner as in Example 1. The resulting coated plate was tested for various properties, and the results are shown in Table 4.

TABLE 4

| | Anodic Oxidation Conditions: Conc. of Sulfuric Acid (%) | Time (min) | Surface Roughness $R_{max}$ (μ) | $R_z$ (μ) | Quality of the Coated Plate: Abrasion Resistance | Adhesion of the Coating |
|---|---|---|---|---|---|---|
| Run No. | | | | | | |
| 4-1 | 6 | 10 | 18 | 10 | Good | Excellent |
| 4-2 | 10 | 10 | 17 | 10 | Excellent | Excellent |
| 4-3 | 20 | 10 | 14 | 9 | Excellent | Good |
| Comparison Run | | | | | | |
| 4-1 | Not performed | | 18 | 11 | Very poor | Good |

EXAMPLE 5

A 99% aluminum plate (JIS 1100) was etched for 10 minutes by immersion in a 15% aqueous solution of hydrochloric acid at a solution temperature of 45° C. to form fine raised and depressed portions on the aluminum surface. The treated surface of the plate was anodically oxidized at a current density of 0.02 A/cm$^2$ in a 5% aqueous solution of oxalic acid at 30° C. under the conditions shown in Table 5. A tetrafluoroethylene resin was coated on the oxidized surface in the same manner as in Example 1. The resulting coated plate was tested for various properties, and the results are shown in Table 5.

TABLE 5

| Run No. | Anodic Oxidation Conditions: Current | Voltage (V) | Time (min) | Surface Roughness $R_{max}$ (μ) | $R_z$ (μ) | Quality of the Coated Plate: Abrasion Resistance | Adhesion of the Coating |
|---|---|---|---|---|---|---|---|
| 5-1 | DC | 30 | 20 | 12 | 8 | Excellent | Excellent |
| 5-2 | AC | 80 | 20 | 13 | 7 | Excellent | Excellent |

While the invention has been described in detail and with reference to specific embodiments thereof, it will be apparent to one skilled in the art that various changes and modifications can be made therein without departing from the spirit and scope thereof.

What is claimed is:

1. A fluorine resin coated structure comprising:
(a) An aluminum or aluminum alloy substrate having fine raised and depressed portions on the surface thereof and wherein said surface is chemically or electrochemically etched;
(b) an anodized layer of aluminum oxide formed on said surface; and
(c) A baked coating of a fluorine resin formed on top of the aluminum oxide coating, the entirety of said fluorine resin surface being in contact with the aluminum oxide coating and with said fluorine resin coating having a thickness of about 5 to about 100 microns, wherein the surface roughness of said coated structure is represented by an $R_{max}$ value of about 5 to about 60(μ) and an $R_z$ value of about 4 to about 50(μ).

2. The fluorine resin coated structure of claim 1, wherein said fluorine resin is polytetrafluoroethylene or a tetrafluoroethylene/hexafluoropropylene copolymer.

3. The fluorine resin coated structure of claim 2, wherein said substrate is aluminum.

* * * * *